(12) United States Patent
Ehrmann et al.

(10) Patent No.: US 11,418,359 B2
(45) Date of Patent: Aug. 16, 2022

(54) PACKAGING MACHINE HAVING A BUS NODE ASSEMBLY

(71) Applicant: Multivac Sepp Haggenmüller SE & Co. KG, Wolfertschwenden (DE)

(72) Inventors: Elmar Ehrmann, Bad Grönenbach (DE); Christian Lau, Heimenkirch (DE); Thomas Pfalzer, Lautrach (DE); Florian Felch, Durach (DE); Claus Botzenhardt, Kempten (DE); Andreas Kurz, Memmingen (DE); Michael Rädler, Kempten (DE); Thorsten Remmele, Westernheim (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 180 days.

(21) Appl. No.: 16/472,474

(22) PCT Filed: Sep. 4, 2017

(86) PCT No.: PCT/EP2017/072073
§ 371 (c)(1),
(2) Date: Jun. 21, 2019

(87) PCT Pub. No.: WO2018/114064
PCT Pub. Date: Jun. 28, 2018

(65) Prior Publication Data
US 2020/0136856 A1    Apr. 30, 2020

(30) Foreign Application Priority Data
Dec. 21, 2016  (DE) .................... 10 2016 125 132.1

(51) Int. Cl.
*H04L 12/40*    (2006.01)
*B29C 65/00*    (2006.01)
(Continued)

(52) U.S. Cl.
CPC ...... *H04L 12/40013* (2013.01); *B29C 66/849* (2013.01); *B65B 9/04* (2013.01); *B65B 59/04* (2013.01); *H04L 2012/4026* (2013.01)

(58) Field of Classification Search
CPC ....... H04L 12/40013; H04L 2012/4026; B29C 66/849; B65B 9/04; B65B 59/04
See application file for complete search history.

(56) References Cited

U.S. PATENT DOCUMENTS

| 7,069,105 | B2 | 6/2006 | Reinisch et al. |
| 9,266,721 | B2 * | 2/2016 | Pruemm ................. B81C 3/008 |

(Continued)

FOREIGN PATENT DOCUMENTS

| DE | 100 12 579 A1 | 9/2001 |
| DE | 20 2007 007 411 U1 | 8/2007 |

(Continued)

OTHER PUBLICATIONS

English translation of EP-1440886-A1 (Year: 2004).*
(Continued)

*Primary Examiner* — Henry Tsai
*Assistant Examiner* — John B Roche
(74) *Attorney, Agent, or Firm* — Brooks Kushman P.C.

(57) ABSTRACT

In a packaging machine, a work station has an interior, which is surrounded by a wall and which has arranged therein a tool with at least one heating element or actor. The invention is characterized by a bus node assembly that is attached to the outside of the wall facing away from the interior and which comprises a housing cap, a circuit board and an interface connected to the circuit board and used for connection to a communication bus.

20 Claims, 4 Drawing Sheets

(51) Int. Cl.
  *B65B 9/04* (2006.01)
  *B65B 59/04* (2006.01)

(56) References Cited

U.S. PATENT DOCUMENTS

| | | | | |
|---|---|---|---|---|
| 9,470,864 | B1* | 10/2016 | Yo | G02B 6/428 |
| 2004/0172658 | A1* | 9/2004 | Rakib | G08B 13/19658 |
| | | | | 725/120 |
| 2011/0044005 | A1* | 2/2011 | Wetzel | H05K 5/0082 |
| | | | | 361/714 |
| 2012/0278610 | A1* | 11/2012 | Waller | H04N 21/2347 |
| | | | | 713/150 |
| 2015/0028730 | A1* | 1/2015 | Loeffel | G01D 11/24 |
| | | | | 312/223.1 |
| 2015/0264772 | A1* | 9/2015 | Iwahashi | H05B 45/20 |
| | | | | 315/312 |

FOREIGN PATENT DOCUMENTS

| | | | | |
|---|---|---|---|---|
| DE | 10 2008 024 461 | A1 | 12/2009 | |
| EP | 1440886 | A1 * | 7/2004 | ............ B65B 19/28 |
| EP | 1440886 | A1 | 7/2004 | |
| EP | 1460502 | A2 | 9/2004 | |
| EP | 2522581 | A1 | 11/2012 | |
| EP | 2860119 | A1 | 4/2015 | |
| EP | 2889229 | B1 | 9/2016 | |
| EP | 3 088 314 | A1 | 11/2016 | |
| WO | 2015/200911 | A1 | 12/2015 | |

OTHER PUBLICATIONS

International Search Report and Written Opinion for PCT/EP2017/072073 dated Nov. 27, 2017.
European Opposition (with English Machine Translation) dated Oct. 15, 2021, Application No. 17764366.5-1216 / 3560149, Applicant MULTIVAC Sepp Haggenmueller SE & Co. KG, 33 Pages.

* cited by examiner

PACKAGING MACHINE HAVING A BUS NODE ASSEMBLY

CROSS-REFERENCE TO RELATED APPLICATIONS

This Application claims priority to PCT Patent Application No. PCT/EP2017/072073 filed on Sep. 4, 2017, currently pending, and German Patent Application No. 10 2016 125 132.1 filed on Dec. 21, 2016 to Elmar Ehrmann, Christian Lau, Thomas Pfalzer, Florian Felch, Claus Botzenhardt, Andreas Kurz, Michael Radler, and Thorsten Remmele, currently pending, the entire disclosure of which is incorporated herein by reference.

FIELD OF THE INVENTION

The present invention relates to a packaging machine with a work station having an interior, which is surrounded by a wall and which has arranged therein a tool with at least one heating element and/or at least one actor, wherein the outside of the wall facing away from the interior has a bus node assembly attached thereto.

BACKGROUND OF THE INVENTION

A packaging machine of the generic kind is known from DE 10 2008 024 461 A1. This packaging machine is provided with various processing stations, such as forming, sealing and cutting stations, which are jointly controlled by a central control unit. Each individual processing station has an individual processing station control unit, which ensures control of a tool provided in the respective station.

Another packaging machine, which is provided with a light band running around the entire packaging machine, is disclosed in EP 3 088 314 A1.

Finally, DE 100 12 579 B4 discloses a processing station with a bus system, which, however, is not related to packaging machines in any way, but intended for use with a closed conveyor path for pallets.

SUMMARY OF THE INVENTION

It is the object of the present invention to further improve a packaging machine with respect to its efficiency of operation and its handling.

The present invention relates to a packaging machine comprising a work station having in its interior a tool with at least one heating element and/or some other actor. The work station may be a forming station having in its interior a forming tool as a tool for thermoforming troughs in a packaging film/foil. Alternatively, the work station may be a sealing station comprising a sealing tool, e.g. a heated sealing plate, as a tool. It would also be imaginable that the work station is a cutting station with a heated knife as a tool. The heating element may be an electric heating element, such as a tubular heater or a resistance heating element or an inductive heating element. An actor is in general an element acting, as part of the tool, on a packaging material, e.g. by application of heat (to this end, the actor may e.g. be an ultrasonic generator) or by application of mechanical forces (to this end, the actor may e.g. be a moving male die part when the work station in question is a forming station).

The outside of the work station has attached thereto a bus node assembly according to the present invention. This bus node assembly comprises a housing cap, which serves to protect against contamination, moisture and/or thermal influences. The housing cap covers at least one circuit board, which is populated with electronic components and which, in turn, is connected to an interface for connection to an electronic communication bus. The bus node assembly is additionally configured for providing, via the interface, information on the tool of the work station and/or for receiving control data for the tool from outside. The information may e.g. be data on the concrete structural design of the tool, while the control data may be operating commands or target values for operating the tool. Both kinds of data may e.g. be an unwinding length of the film web, the size of a sealing area, a sealing temperature, a format designation of the tool, a tool stroke, or maximum or minimum values for the above-mentioned parameters.

A bus or communication bus is here, as is normally the case, considered to be a system for data transmission between a plurality of participants via a common transmission path. A bus node is a component connected to the bus, generally also referred to as bus participant. A bus node assembly comprises such a bus node.

A technical advantage of the present invention resides in the fact that electronics, which had been located in a central control cabinet in the case of conventional machines, is relocated into the bus node assembly as a mechatronic component. This has the effect that the space required for the central control cabinet and thus possibly also for the packaging machine in its entirety will become smaller. A further advantage is that, due to its arrangement on the outside of the wall of the work station, the bus node assembly is easily accessible, in particular for allowing the bus node assembly to be serviced or reconfigured. In addition, less wiring will be necessary and this, in turn, makes it easier to operate the machine as hygienically as possible.

As a particularly advantageous variant, the bus node assembly provides a carrier for the circuit board. This carrier may be a stable structure, which protects the possibly delicate circuit board against mechanical loads. Preferably, the carrier has enough dimensional stability to withstand pressure differences of up to 6 bars between the carrier side facing the circuit board and that facing away from the circuit board.

Preferably, the carrier hermetically separates a side facing the circuit board from an opposite side, i.e. a side facing away from the circuit board. The carrier side facing away from the circuit board can thus be exposed to the possibly varying pressure conditions prevailing in the interior of the work station, without exposing the circuit board to these pressure differences.

According to an expedient embodiment, the carrier comprises aluminum as a material.

It may be expedient to arrange the bus node assembly on top of an opening in the wall of the work station such that the housing cap and/or the carrier fully covers the opening. This opening can allow access to the workstation interior, e.g. for the purpose of measurement or in order to facilitate tool changing. At the same time, the housing cap protects not only the parts of the bus node assembly contained therein, but also the opening and thus the interior of the work station.

Preferably, a seal, which may e.g. be a silicone mat, is provided between the carrier and the circuit board. This seal prevents dust, humidity or moisture from penetrating between the carrier and the circuit board. If the seal comprises a flexible material, it will also absorb shocks between the carrier and the circuit board.

It also turns out to be advantageous when the housing cap is releasably fastenable to the wall of the work station, e.g. by means of threaded bolts. Removing the housing cap can then allow the at least one circuit board of the bus node assembly to be checked or reconfigured.

According to a particularly advantageous embodiment, an annular seal is provided, which extends annularly around the housing cap thus sealing the latter against the outside of the wall, preferably in a water-proof, dust-proof and/or splash-proof manner. In this way, the bus node assembly, in particular the circuit board and its electronic components, are protected in a particularly effective manner against negative influences during operation and/or cleaning of the packaging machine.

According to a variant of the present invention, the annular seal is transparent or translucent in its entirety or at least sectionwise. To this end, the annular seal may consist e.g. of silicone.

It is also imaginable that the bus node assembly comprises a light source, which may be provided e.g. in the form of one or a plurality of light-emitting diodes. The at least one light source may be operated via the circuit board of the bus node assembly.

It will be expedient to arrange the at least one light source inside the housing cap or on an edge of the housing cap facing the annular seal. This means that the light source is protected by means of the housing cap and/or the annular seal against negative influences caused by dust, water or humidity, and that it illuminates the housing cap and/or the annular seal so to speak from inside.

According to a specific concept of operating the packaging machine disclosed by the present invention, the light source is controllable for generating different colors and/or different temporal or spatial light patterns. The bus node assembly can thus provide the operator of the packaging machine with an optical status message concerning the operation of the work station having the respective bus node assembly attached thereto. For example, the light source may light up in blue, green, yellow/orange or red, with green or blue light indicating a correct operation of the work station, yellow/orange light indicating a warning and red light indicating an error message or a standstill of the workstation. As a temporal light pattern having a special warning effect, flashing of the light source would be imaginable, as a spatial light pattern it would be imaginable that a light signal runs back and forth or circumferentially around the annular seal of the bus node assembly. Additionally or alternatively to optical information transmission via the at least one light source, also acoustic information transmission to the operator would be imaginable, e.g. via a tone generator.

The information concerning the tool and provided via the interface may in particular comprise an identification of the respective tool, by means of which the tool can be identified unequivocally. This is advantageous for preventing, by way of example, the work station and thus the entire packaging machine from being operated with unsuitable tools. In addition, after the exchange of a suitable tool, it will also be possible to adapt the operation of the work station and/or of the entire packaging machine on the basis of the identification to the respective tool and its characteristics.

Preferably, the interface is a bidirectional interface, so that it will not only be used for outputting data or information from the tool to the outside to the bus, but also for receiving control data via the interface and forwarding them to the tool.

It will also be of advantage, when communication via the interface is encrypted, since this will improve the process safety of the packaging machine.

In addition, the circuit board of the bus node assembly may have provided thereon one or a plurality of control elements, in particular electrical or electronic control elements, for controlling the at least one heating element of the tool, so that, especially for these control elements, less space or no space at all must be kept available in a central control cabinet of the packaging machine. The control elements may be contactors or solid-state relays.

According to an expedient variant of the present invention, one or a plurality of sensors are provided in the work station, the sensors measuring e.g. a temperature of the tool or of the heating elements, a pressure of actors of the work station or the gas pressure in a work chamber of the work station. Specific electronic components on the circuit board may then be configured for receiving and/or evaluating signals from said one or said plurality of sensors.

Finally, the bus node assembly is preferably configured for connection to a hybrid cable, via which a power supply as well as the communication bus are coupled to the bus node assembly. Other aspects and advantages of the present invention will be apparent from the following detailed description of the preferred embodiments and the accompanying drawing figures.

DESCRIPTION OF THE SEVERAL VIEWS OF THE DRAWINGS

In the following, the present invention will be explained in more detail on the basis of embodiments. The individual figures show.

DETAILED DESCRIPTION OF THE INVENTION

Figure 1:
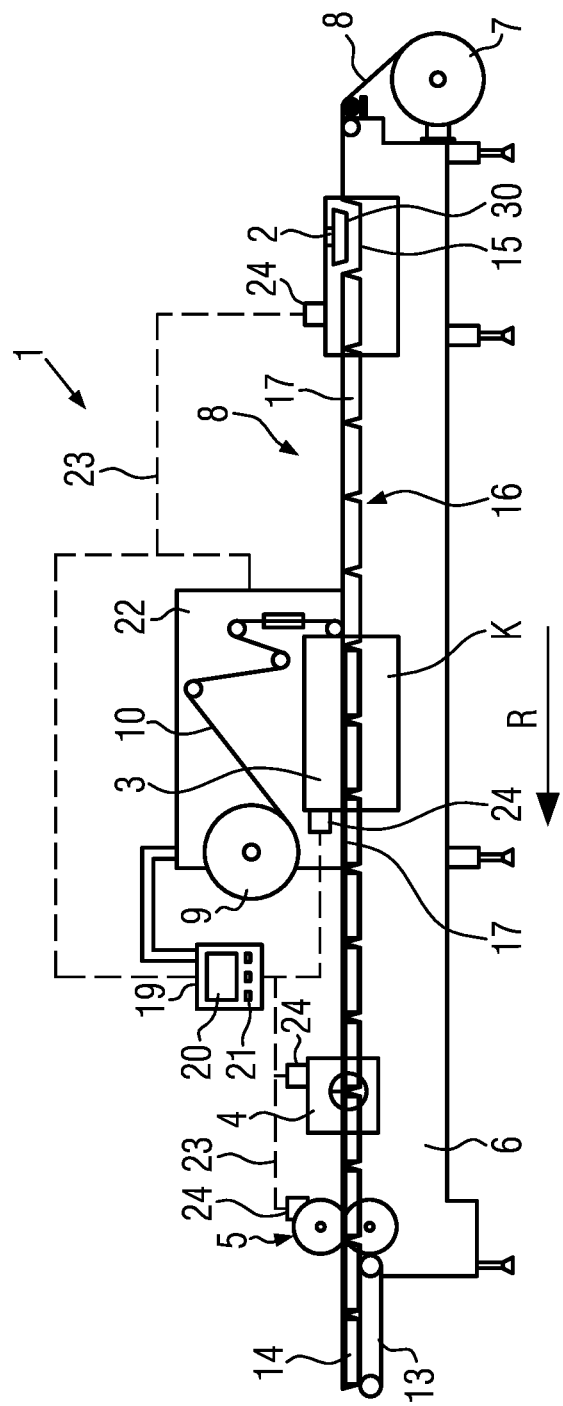
FIG. 1 is a schematic side view of one embodiment of a packaging machine according to the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a schematic side view of an intermittently operating thermoform packaging machine 1 according to the present invention. This thermoform packaging machine 1 comprises a forming station 2, a sealing station 3, a cross cutting unit 4 and a longitudinal cutting unit 5, which are arranged, in this sequence, on a machine frame 6 in a conveying direction R. On the input side, the machine frame 6 has provided thereon a supply roll 7, from which a bottom film/foil 8 is unwound. In the area of the sealing station 3, a material storage unit 9 is provided, from which a cover film/foil 10 is unwound. On the output side, the thermoform packaging machine 1 has provided thereon a discharge unit 13 in the form of a conveyor belt, by means of which finished, singulated packages 14 are transported away. The thermoform packaging machine 1 further comprises a feeding device, which is not shown in detail and which grips the bottom film 8 and advances it in the conveying direction R per main work cycle. The feeding device may e.g. be configured such that it comprises conveyor chains or clamp chains provided on both sides.

In the embodiment shown, the forming station 2 is configured as a thermoforming station, in which troughs 15 are thermoformed into the bottom film 8, e.g. by means of pressurized air and/or a vacuum. The forming station 2 may here be configured such that, in the direction perpendicular to the conveying direction R, a plurality of troughs 15 is formed side by side. Downstream of the forming station 2, when seen in the conveying direction R, an infeed line 16 is provided, along which the troughs 15 formed in the bottom film 8 are filled with products 17.

The sealing station 3 is provided with a hermetically closable chamber K, in which, prior to sealing with the cover film 10, the atmosphere in the troughs 15 can e.g. be evacuated and/or substituted by an exchange gas or a gas mixture by means of gas flushing.

The cross cutting unit 4 is configured as a punch, which cuts the bottom film 8 and the cover film 10 in a direction transversely to the conveying direction R between neighboring troughs 15. In so doing, the cross cutting unit 4 works such that the bottom film 8 is not cut over the entire width, but remains uncut at least in an edge area thereof. This allows controlled further conveyance by the feeding device.

In the embodiment shown, the longitudinal cutting unit 5 is configured as a blade arrangement by means of which the bottom film 8 and the cover film 10 are cut between neighboring troughs 15 and at the lateral edge of the bottom film 8 in the longitudinal direction R, so that, downstream of the longitudinal cutting unit 5, singulated packages 14 are obtained.

The packaging machine 1 is additionally provided with a controller 19. The controller 19 has the function of controlling and monitoring the processes taking place in the packaging machine 1. A display device 20 with operating elements 21 serves to visualize the sequences of process steps in the thermoform packaging machine 1 for an operator and to influence them by the operator.

A control cabinet 22 has arranged therein central electric components of the thermoforming machine 1, e.g. the connection to an external power source. Via a communication bus 23, hereinafter referred to as bus for short, the controller 19 exchanges data with the work stations 2, 3, 4, 5 of the thermoforming packaging machine 1 and with the control cabinet 22. At least a single one, but preferably a plurality of work stations 2, 3, 4, 5 has provided thereon a respective bus node assembly 24 for connection to the communication bus 23.

Figure 2:
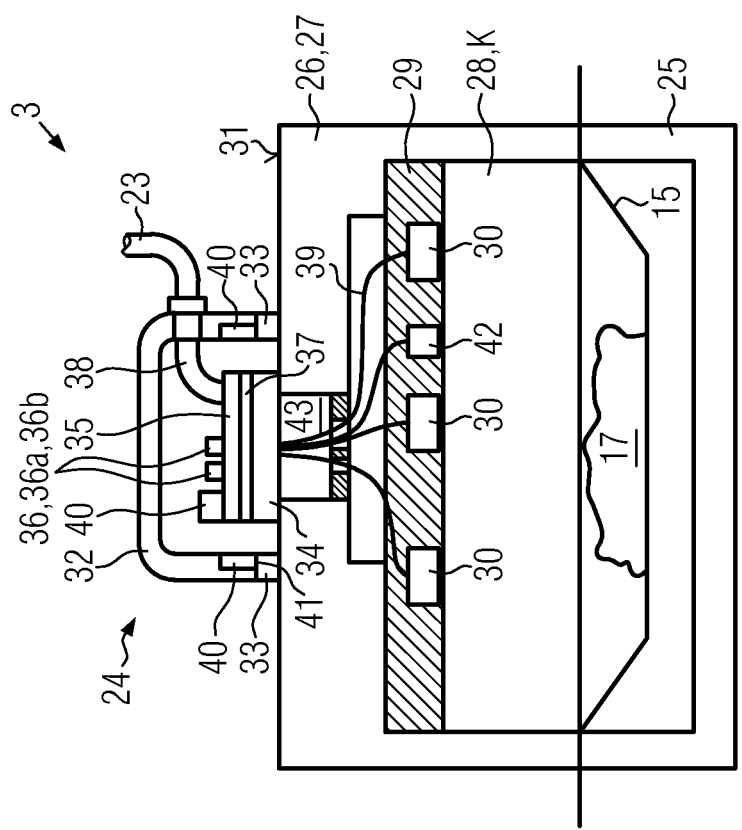
FIG. 2 is a schematic sectional view of one embodiment of a work station of a packaging machine in accordance with the present invention.

FIG. 2 shows schematically a vertical section through the sealing station 3 as an example for a work station. The sealing station 3 comprises a lower part 25, which is adapted to receive therein one or a plurality of packaging troughs 15, as well as a bell-shaped upper part 26 with a wall 27 surrounding an interior 28. The lower and upper parts 25, 26 can be closed so as to define in common the hermetically closed sealing chamber K.

The interior 28 of the sealing station 3 has arranged therein a tool 29, which is here a sealing plate. If the work station in question is a forming station 2, the tool 29 can be a heating plate or a heated forming tool. The tool 29 comprises at least one heating element 30, by means of which it is preferably electrically heatable. In FIG. 2, three such heating elements 30 are shown, which are embedded in the tool 29. Alternatively or additionally, the tool 29 comprises at least one actor 30—in the case of a forming station 2 e.g. a movable male die part 30, cf. FIG. 1.

The outside 31 of the wall 27, which faces away from the interior 28, as attached thereto a bus node assembly 24 in accordance with the present invention. This bus node assembly 24 comprises a housing cap 32, which may be formed of a plastic material, the plastic being either light-permeable or light-impermeable. An annular seal 33 made of flexible material seals the housing cap 32 against the outside 31 of the wall 27 in an at least dust-proof and/or splash-proof manner. The annular seal 33 is preferably made of transparent or translucent material; it may, for example, contain silicone or consist of silicone.

Inside the housing cap 32, a solid and stable carrier 34 is provided, which is made e.g. of aluminum. The carrier 34 supports a circuit board 35 carried thereby, which is populated with electronic components 36. The circuit board 35 and the carrier 34 have arranged between them a seal 37, e.g. in the form of a silicone mat 37.

The bus node assembly 24 additionally comprises an interface 38, which is connected to the circuit board 35 and by means of which the circuit board 35 is connected to the communication bus 23. Electric lines 39 connect the circuit board 35 to the respective heating elements 30 and/or actors 30. These electric lines 39 are used for providing power for operating the heating elements 30 and/or actors 30.

The bus node assembly 24 additionally comprises at least one light source 40, e.g. in the form of one or a plurality of LEDs. In the present embodiment, the light source 40 is arranged on the circuit board 35 and is operated by the latter. The light source 40 may be operated such that the light source 40 is controlled to generate different colors (e.g. blue, green, yellow/orange or red), different illumination intensities and/or different temporal light patterns (e.g. flashing). If more than one light source 40 is provided, these light sources may also be controlled to generate different spatial light patterns, e.g. moving light patterns. To this end, one or a plurality of the light sources may e.g. be arranged, additionally or alternatively, on an edge 41 of the housing cap 32 facing the annular seal 33. In the embodiment shown, these light sources 40 are positioned in a recess provided in the edge 41 of the housing cap 32 facing the annular seal 33. Alternatively, the light sources 40 are part of the circuit board 35, which may extend up to the housing cap 32.

In addition to the electronic components 36, also one or a plurality of control elements 36a for controlling the at least one heating element or actor 30 may be provided on the circuit board 35. Control elements 36a for the heating elements 30 are here considered to be e.g. contactors or solid-state relays. Certain electronic components 36b on the circuit board 35 may be configured for receiving and/or evaluating signals from one or from a plurality of sensors 42 provided in the work station 3. These sensors may e.g. be temperature sensors 42 for measuring the temperature of the tool 29, pressure sensors 42 for measuring a pressure in the interior 28 and in the sealing chamber K, respectively, or a gas sensor 42 for measuring a content of oxygen or of some other gas. In the case of a sealing station, a position sensor 42 may be provided for detecting a position of the sealing plate.

FIG. 2 additionally shows that the wall 27 of the sealing station 3 has provided therein an opening 43, which, in the present case, even continues down to the interior 28. The opening 43 is fully covered by the housing cap 32 of the bus node assembly 24. In the present embodiment, the carrier 34 is even so large that the opening 43 is already fully covered by the carrier 34 itself.

Figure 3:
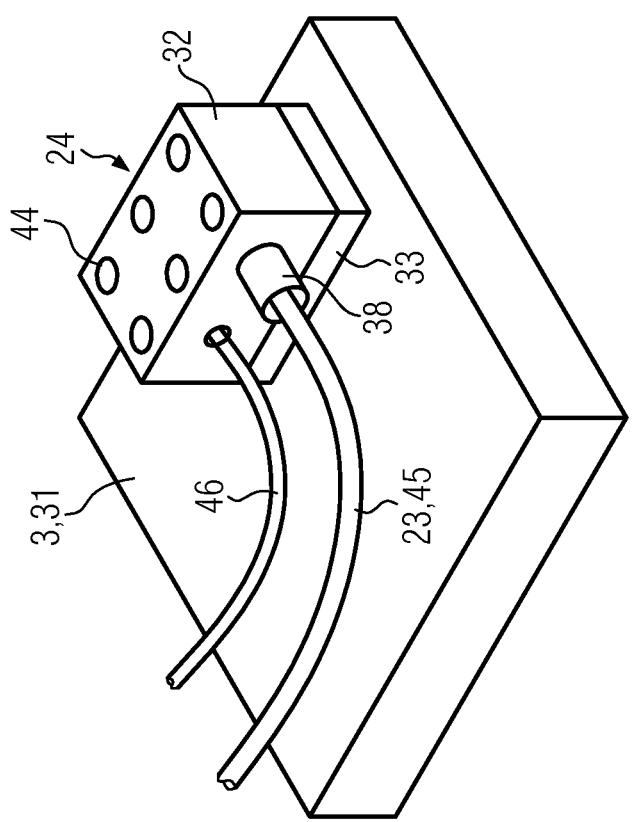
FIG. 3 is a schematic perspective view of a first embodiment of a bus node assembly in accordance with the present invention.

FIG. 3 shows, in a perspective view, the bus node assembly 24 arranged on the outside 31 of the wall 27 of the work station 3. What can be seen are the heads of a number of six threaded bolts 44 in the present embodiment, by means of which the bus node assembly 24 and its housing cap 32, respectively, are releasably fastened to the outside 31 of the wall 27. What can additionally be seen is that the annular seal 33 for sealing the housing cap 32 from the outside 31 of the wall 27 is visible from outside. The annular seal 33 extends around the housing cap 32 and can be illuminated from inside by means of the light source(s) 40.

In the embodiment according to FIG. 3, a data cable 45 is provided for the communication bus 23, the data cable 45 being routed into the bus node assembly 24 in the area of the interface 38. The data cable 45 may e.g. by an Ethernet or EtherCAT cable. In addition, a separate power cable 46 is provided for supplying power to the bus node assembly 24 and, via the latter, to the heating elements 30 of the tool 29, the power cable 46 being routed parallel to the data cable 45 into the bus node assembly 24.

Figure 4:
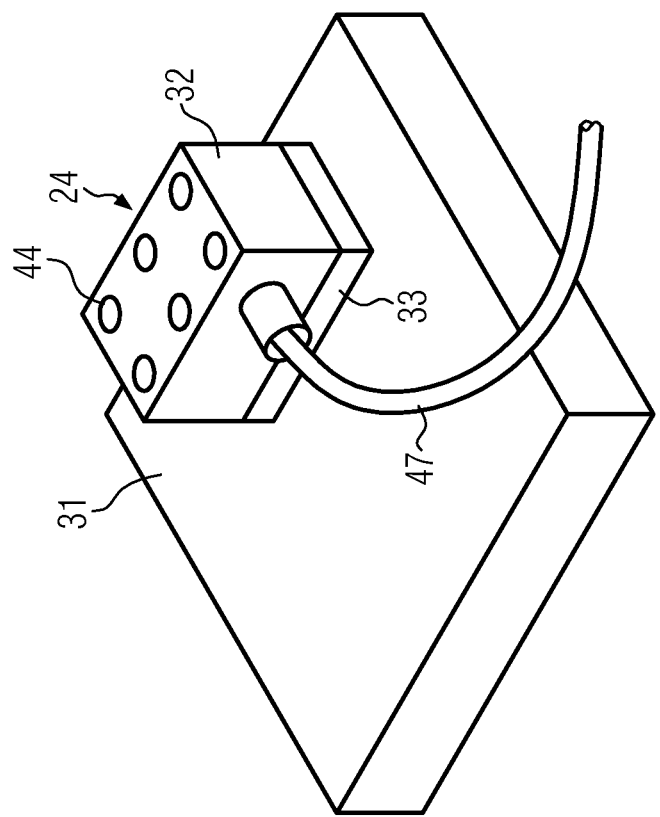
FIG. 4 is a schematic perspective view of a second embodiment of a bus node assembly in accordance with the present invention.

In the embodiment according to FIG. 4, however, a hybrid cable 47 is provided, which is used for data exchange via the communication bus 23 as well as for power supply to the bus node assembly 24.

Instead of being made of plastic, the housing cap 32 of the bus node assembly 24 may also be configured in a more stable manner, e.g. as a die-cast aluminum part. Instead of threaded bolts 44, also other means may be used for releasably fastening the housing cap 32 to the wall 27 of the respective work station 2, 3, 4, 5, e.g. clips or clamps.

Figure 5:
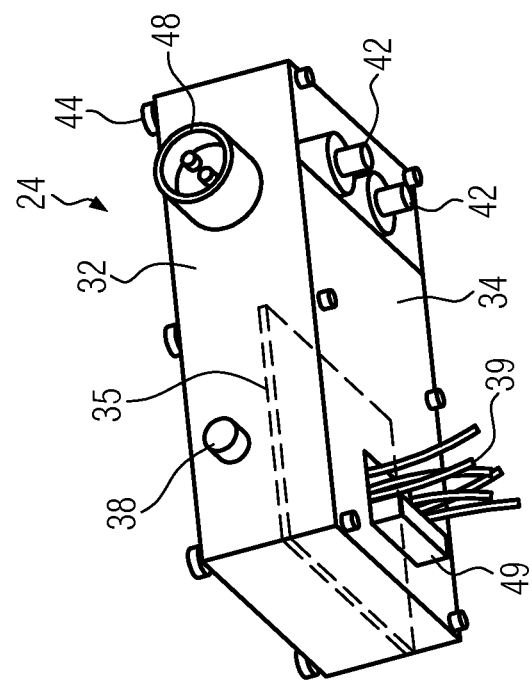
FIG. 5 is a further schematic perspective view of one embodiment of a bus node assembly in accordance with the present invention.

FIG. 5 shows a perspective view of the bus node assembly 24. What can be seen is the housing 32, which, by means of the threaded bolts 44, is releasably fastened to the outside 31 of the wall 27 of the respective work station 2, 3, 4, 5. In the semi-transparent representation of the housing cap 32, the circuit board 35, which is carried by the carrier 34, becomes visible. On the outside of the housing cap 32, there is a connection 38 as an interface to the communication bus 23 as well as a further connection 48 for connecting the power cable 46.

Starting from the circuit board 35, the electric lines 39 for supplying power to the heating elements 30 penetrate the carrier 34. In addition, the bus node assembly 24 comprises in the present embodiment a connector strip 49, which is e.g. mechanically connected to the carrier 34 and to which further loads and/or sensors 42 can be connected. In the present embodiment, two sensors 42, e.g. pressure sensors or sensors for measuring the concentration of certain gases, are integrated in the bus node assembly 24. These integrated sensors 42 may be provided in addition to or as an alternative to the sensors 42 arranged e.g. in tool 29.

Figure 6:
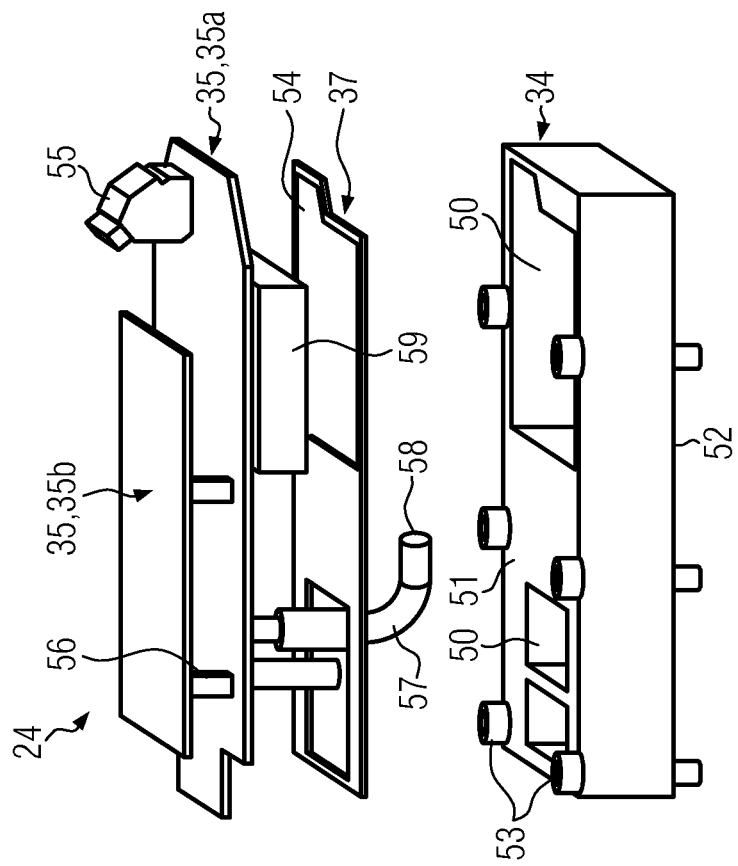
FIG. 6 is an exploded schematic perspective view of one embodiment of a bus node assembly in accordance with the present invention.

FIG. 6 shows an embodiment of the bus node assembly 24 in an exploded view. What can be seen is that the carrier 34, formed e.g. from aluminum, has openings 50, which penetrate the carrier 34 from its side 51 facing the circuit board 35 to the opposite side 52 facing the wall 27. These openings 50 define potting nests, into which a potting compound, such as polyurethane, can be cast during assembly after cables have been passed-through or electronic components 36 have been installed on the circuit board 35. By means of a plurality of threaded bolts 53, the carrier 34 can be connected, firmly but releasably, to the outside 31 of the wall 27.

Also the seal 37, configured as a silicone mat, has openings 54, which are substantially congruent with the shape of the openings 50 in the carrier 34, and which could even have precisely the same size.

In the present embodiment, the bus node assembly 24 comprises two different circuit boards 35a, 35b, viz. one power board 35a and one logic board 35b. The power board 35a has provided thereon a plug or contact arrangement 55 for connecting to the connection 48 for the power cable 46. A plurality of pins 56 carry the logic board 35b and hold it at a predetermined distance relative to the power board 35a. Starting from the circuit boards 35a, 35b, electric contacts or contact pins 57 extend through the seal 37 and the carrier 34. The electric contacts 57 may be configured e.g. as brass contact pins and may, optionally, be encased by a plastic sleeve 58.

The tool 29 used in the respective work station 2, 3, 4, 5 may be provided with an individual, unequivocal identification. The bus node assembly 24 is able to read, in a wire-bound or wireless fashion, this identification of the tool 29 and to make it available to the thermoform packaging machine 1 via the bus 23 of the controller 19. This, in turn, allows the controller 19 to check, whether the correct tool 29 is installed. If an incorrect tool 29 is installed, an error message can be issued. If, however, a correctly installed tool 29 is identified, the operation of the thermoform packaging machine 1 or of the work station 2, 3, 4, 5 can be adapted to the respective tool 29. For reading the identification of the tool 29, e.g. an (RFID) read head 59 may be connected to the circuit board 35, 35b.

It follows that the bus node assembly 24 can transmit data concerning the tool 29 to the machine controller 19 via the bus 23. At the same time, it can receive control commands or configuration data from the controller 19 via the bus 23, e.g. data concerning specific heating or sealing processes, the film width, the unwinding length, the format division, the sealing area or the sealing pressure.

Making use of the sensors 42, the operation of the respective work station 2, 3, 4, 5 can be monitored, so that status signals can be transmitted to the controller 19 of the packaging machine 1 via the bus 23, e.g. status signals with respect to the pressure prevailing in the chamber K, the concentration of certain gases, the sealing pressure used, the temperature prevailing, etc.

Due to its shape, which is attached to the outside 31 and which projects beyond the outside 31, and the at least one light source 40, the bus node assembly 24 also allows to give feedback to the operator of the packaging machine 1 about the status and operation of the respective work station 2, 3, 4, 5. For example, the light source 40 may light up in blue or in green, if the work station 2, 3, 4, 5 works correctly. The operator will see this—largely independently of his position at the moment in question—via the annular seal 33 that is illuminated from inside. The light source 40 may light up in yellow/orange, if the operation of the workstation 2, 3, 4, 5 or its tool 29 is about to become problematic or requires inspection by the operator. A light source 40 lighting up in red may, however, indicate that the work station blocks or stands still. The arrangement of the bus node assemblies 24 at or on the respective work stations 2, 3, 4, 5 allows the operator to detect very quickly at which work station the problem arose. This will minimize the time required for solving the problem, and thus improve the operation of the packaging machine 1. Alternatively or additionally, the warning signal can attract more attention when the light source 40 flashes. Here, various modes are imaginable, which can be evaluated by the operator of the packaging machine 1 by means of respective explanations in the operating manual of the packaging machine 1.

The bus node assembly 24 according to the present invention offers additional advantages insofar as it allows a watertight and, optionally, vacuum- or pressure-tight routing of cables into the interior 28 of the respective work stations 2, 3, 4, 5. In addition, due to the fact that it is releasably fastened to the wall 27, the bus node assembly 24 can easily be serviced and/or replaced.

On the basis of the embodiments shown, various changes are imaginable, without departing from the scope of protection of the present invention. The described components and elements of the bus node assembly 24 can be combined with one another in an arbitrary manner.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A packaging machine comprising a work station having an interior, which is surrounded by a wall and which has arranged therein a tool having one of at least one heating element or at least one actor, wherein an outside of the wall facing away from the interior has attached thereto a bus node assembly comprising the following:
   a housing cap;
   at least one circuit board populated with electronic components; and
   an interface connected to the at least one circuit board and used for connection to a communication bus;
   wherein the bus node assembly is configured to at least one of provide one or more items of information on the tool or receive control data for the tool via the interface.

2. The packaging machine according to claim 1, wherein the bus node assembly comprises a carrier for the circuit board.

3. The packaging machine according to claim 2, wherein the carrier hermetically separates a first side of the carrier facing the circuit board from a second side of the carrier facing away from the circuit board.

4. The packaging machine according to claim 2, wherein the carrier comprises aluminum.

5. The packaging machine according to claim 2, wherein the bus node assembly is disposed on top of an opening in the wall such that the housing cap fully covers the opening.

6. The packaging machine according to claim 2, wherein a seal is disposed between the carrier and the circuit board.

7. The packaging machine according to claim 1, wherein the housing cap is releasably fastened to the wall.

8. The packaging machine according to claim 1, wherein an annular seal extends annularly around the housing cap thereby sealing the housing cap against the outside of the wall.

9. The packaging machine according to claim 8, wherein the annular seal is transparent or translucent.

10. The packaging machine according to claim 1, wherein the bus node assembly comprises at least one light source.

11. The packaging machine according to claim 10, wherein the at least one light source is arranged at one of inside the housing cap or on an edge of the housing cap facing an annular seal.

12. The packaging machine according to claim 10, wherein the at least one light source is controllable for generating different colors, different illumination intensities and/or different temporal or spatial light patterns.

13. The packaging machine according to claim 1, wherein the one or more items of information on the tool comprise an identification of the tool, and the one or more items of information are providable via the interface.

14. The packaging machine according to claim 1, wherein the interface is a bidirectional interface and a communication via the interface is encrypted.

15. The packaging machine according to claim 1, wherein the at least one circuit board has provided thereon one or more control elements for controlling one of the at least one heating element or the at least one actor.

16. The packaging machine according to claim 1, wherein the at least one circuit board includes one or more electronic components capable to at least one of receive and evaluate signals from one or more sensors provided in the work station.

17. The packaging machine according to claim 1, wherein the bus node assembly is capable to have a hybrid cable connected thereto.

18. A packaging machine comprising a work station having an interior, which is surrounded by a wall and which has arranged therein a tool having one of at least one heating element or at least one actor, wherein an outside of the wall facing away from the interior has attached thereto a bus node assembly comprising:

a housing cap;

a transparent or translucent annular seal that extends annularly around the housing cap thereby sealing the housing cap against the outside of the wall;

a light source arranged inside of the housing cap, wherein the light source is operable to illuminate the annular seal;

at least one circuit board populated with electronic components; and an interface connected to the at least one circuit board and used for connection to a communication bus;

wherein the bus node assembly is configured to 1) provide one or more items of information on the tool or 2) receive control data for the tool via the interface.

19. The packaging machine according to claim 18, wherein the light source is operable to illuminate the annular seal to provide an indication of a status of the work station that is viewable outside of the annular seal.

20. The packaging machine according to claim 18, wherein the one or more items of information on the tool comprise an identification of the tool, and the bus node assembly comprises a read head to read the identification.

* * * * *